United States Patent [19]

Dupont

[11] Patent Number: 4,815,365
[45] Date of Patent: Mar. 28, 1989

[54] SELF-VENTILATING GREENHOUSE

[76] Inventor: Daniel L. Dupont, 22-B Talbot Rd., Plaquemine, La. 70764

[21] Appl. No.: 184,360

[22] Filed: Apr. 21, 1988

[51] Int. Cl.$^4$ ............................................. F24F 7/02
[52] U.S. Cl. ........................................ 98/42.2; 52/2; 52/18; 52/64; 52/222; 98/42.16; 47/17
[58] Field of Search .............. 47/17, 19; 52/2 R, 2 G, 52/2 H, 18, 64, 68, 222; 98/42.14, 42.16, 42.2, 42.21

[56] References Cited

U.S. PATENT DOCUMENTS

| 104,142 | 6/1870 | Hall | 52/18 |
|---|---|---|---|
| 1,070,434 | 8/1913 | Farquhar | 52/18 |
| 1,923,217 | 8/1933 | Lafferty | 47/17 |
| 3,028,872 | 4/1962 | Cresswell | 47/17 X |
| 4,012,867 | 3/1977 | Lainchbvry et al. | 52/2 |
| 4,312,157 | 1/1982 | Hertel et al. | 52/13 |
| 4,348,833 | 9/1982 | Nagoya | 47/17 |
| 4,399,738 | 8/1983 | Sharkey | 98/32 |
| 4,510,921 | 4/1985 | Yano et al. | 126/429 |
| 4,601,136 | 7/1986 | Watanabe | 52/63 |
| 4,672,889 | 6/1987 | Lynch | 98/42.2 |

FOREIGN PATENT DOCUMENTS

| 662194 | 7/1938 | Fed. Rep. of Germany | 47/17 |
|---|---|---|---|
| 925981 | 4/1955 | Fed. Rep. of Germany | 47/17 |
| 861621 | 5/1963 | Fed. Rep. of Germany | 47/17 |
| 1101240 | 1/1968 | United Kingdom | 47/17 |

Primary Examiner—Harold Joyce
Attorney, Agent, or Firm—Reginald F. Roberts, Jr.

[57] ABSTRACT

A self-ventilating greenhouse and frame therefor. The frame comprises a series of aligned sideposts connected to a series of partially overlapping frame members which support a translucent roof. The frame members are hingedly joined by a series of cross-members which guide the frame members as the roof is opened and closed by means of a worm gear or a rack and pinion.

10 Claims, 4 Drawing Sheets

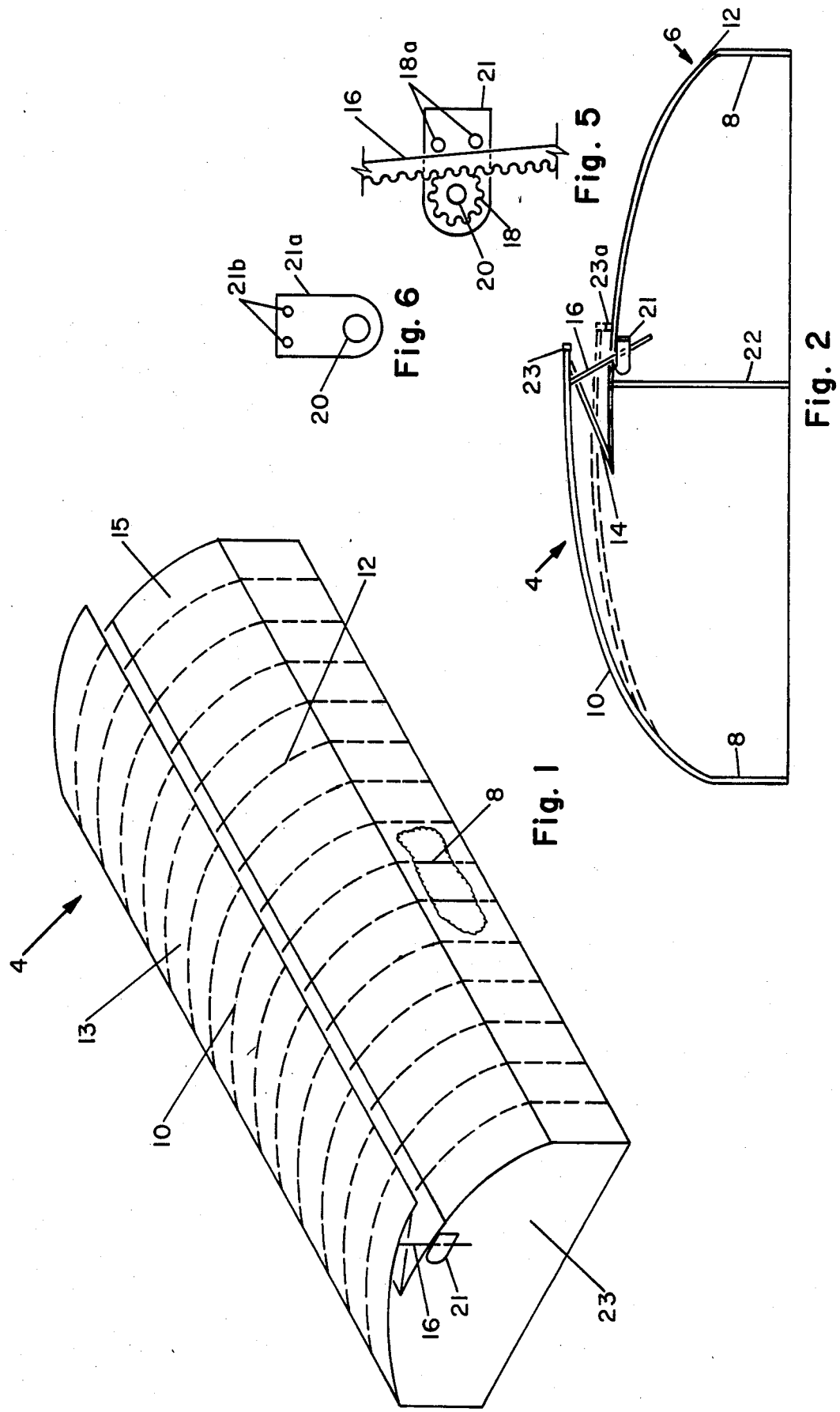

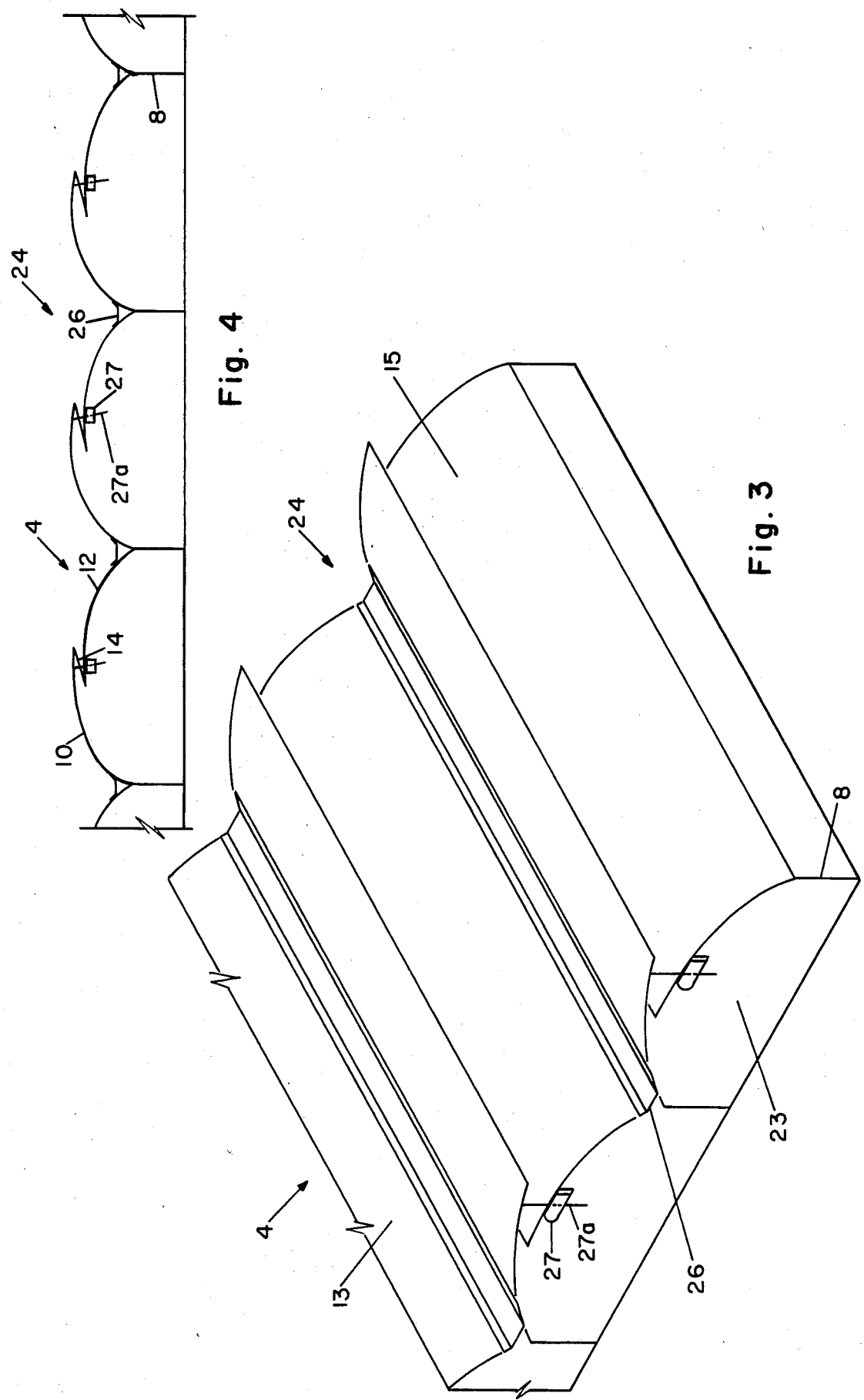

SELF-VENTILATING GREENHOUSE

BACKGROUND OF THE INVENTION

The present invention relates to greenhouses. More particularly, the invention relates to the ventilation of greenhouses.

An efficient ventilation system is a very important part of any greenhouse. Prior-art means and methods for ventilating greenhouses are many and varied, but the ventilation means either comprise structures separate from the main structure of the greenhouse, or they require specialized and expensive equipment.

SUMMARY OF THE INVENTION

In general, the present invention in one aspect provides a frame for a self-ventilating greenhouse. The frame comprises first and second parallel rows of upright posts, and first and second sets of a plurality of first and second partially overlapping upper and lower frame members. A first end of each first frame member and a first end of each second frame member are connected to the upper end of a post in the first row and the upper end of a post in the second row of posts, respectively. The second end of the first frame member is disposed above and overhangs the second end of the second frame member. The first and second frame members form a frame for a self-ventilating roof for the greenhouse. This embodiment of the invention further comprises a plurality of cross-members hingedly connecting the first and second frame members near the second ends of the frame members, to guide the frame members as the frame members are separated and reunited to provide intermittent ventilation for the greenhouse; and means for separating and reuniting the frame members.

In a second aspect, the invention provides a self-ventilating greenhouse. The frame for the greenhouse includes first and second parallel rows of upright posts, and first and second sets of a plurality of first and second partially overlapping upper and lower frame members. A first end of each first frame member and a first end of each second frame member are connected to the upper end of a post in the first row and the upper end of a post in the second row of posts, respectively. The second end of the first frame member is disposed above and overhangs the second end of the second frame member. The first and second frame members form a frame for a self-ventilating roof for the greenhouse. This second embodiment of the invention further comprises a plurality of transverse members hingedly connecting the first and second frame members near the second ends of the frame members, to guide the frame members as the frame members are separated and reunited to provide intermittent ventilation for the greenhouse; means for separating and reuniting the frame members; a first translucent sheet disposed above and supported by the first frame members; and a second translucent sheet disposed above and supported by the second set of frame members. The first and second translucent sheets form a self-ventilating roof for the greenhouse.

BRIEF DESCRIPTION OF THE DRAWINGS

FIG. 1 is an isometric view of a first embodiment of a greenhouse made in accordance with the principles of the present invention.

FIG. 2 is a side view of the same, with the end walls and roof omitted to show the frame.

FIG. 3 is a schematic representation of a second embodiment of a greenhouse made in accordance with the principles of the present invention, showing only the external features of the greenhouse.

FIG. 4 is a side view of the same, with the end walls and roof omitted to show the frame.

FIG. 5 is a schematic representation of a rack and pinion, with a case enclosing same.

FIG. 6 is a schematic representation of a bracket used to support a shaft on which a rack and pinion are mounted.

DESCRIPTION OF THE PREFERRED EMBODIMENTS

Figure 8:
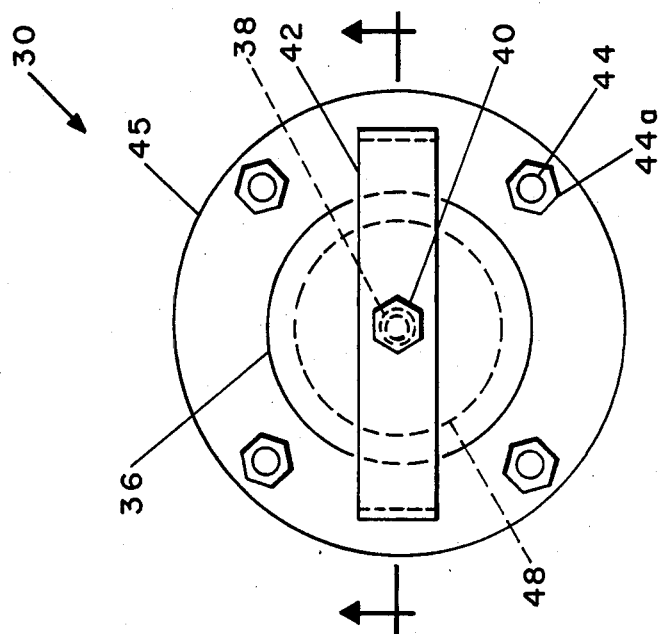
FIG. 8 is a top view of the device shown in FIG. 7.

More specifically, reference is made to FIGS. 1 and 2, which show a greenhouse made in accordance with the principles of the present invention.

The greenhouse, generally designated by the numeral 4, comprises a frame, designated generally as 6 in FIG. 2. The frame 6 comprises a plurality of aligned first and second sideposts 8, and a plurality of first and second partially overlapping upper and lower frame members 10 and 12, respectively. One end of each frame member 10, 12 is connected to the upper end of a sidepost 8. The lower end of each sidepost 8 is firmly embedded in the ground, in a cement base, or other stable horizontal surface or member. The other ends of the upper frame members 10 are disposed above and overhang the other ends of the second frame members 12. The upper and lower frame members 10, 12 support first and second translucent sheets 13 and 15, respectively, thereby providing a roof for the greenhouse 4.

The frame 6 further comrprises a plurality of transverse cross-members 14 which are hingedly connected to the upper and lower frame members 10 and 12 for the purpose of guiding the frame members as they are separated and reunited to provide intermittent ventilation for the greenhouse. The separation and reunion of the frame members 10, 12 are effected by means such, e.g., as a rack 16 and pinion 18 mounted on a shaft 20 which serves as an axle for the rotation of the pinion 18. As more clearly shown in FIGS. 5 and 6, the rack 16 and pinion 18 are held together by and disposed within a case 21. The shaft 20 is beneficially supported by a support bracket 21a which may be fastened to one of the lower frame members 12. In the preferred embodiments of the invention, at least some of the lower frame members 12 are further supported by a centerpost 22. Optionally, the bracket 21a may be fastened to and supported by the centerpost 22. The bracket 21a is fastened to the member 12 or to the post 22 by bolts or the like passing through holes 21b.

Opening the frame 6 to provide ventilation for the greenhouse 4 is accomplished by rotating the pinion 18 on the shaft 20 in a direction which causes the rack 16 to move upward on rollers 18a, thereby raising the upper frame member 10.

The ends of the greenhouse 4 are enclosed by walls 23. The sides of the greenhouse are formed of translucent sheets 13a which are supported by the sideposts 8. When ventilation is desired, the roof is opened as previously described, and the lower ends of the sheets 13a are raised to about the top of the posts 8. When the greenhouse 4 is closed, the roof is closed down and the sheets 13a are lowered to about ground level.

The sheets 13, 15 and 13a are beneficially made of flexible, translucent poly(ethylene) sheeting, but any other suitable material may be used. The sheets 13, 15 are anchored to the frame members 10, 12 by any number of means which are well known in the art. A particularly convenient means is the use of square tubes 23a, which efficiently seal the roof of the greenhouse 4 when the roof is closed.

The concept illustrated in FIGS. 1 and 2 can easily be expanded to include a plurality of articulated structures, as shown in FIGS. 3 and 4. Here the individual units 4 are joined side-by-side, and are beneficially separated by a gutter 26 for the collection and disposal of rainwater descending from the roof 13, 15. In this connection it is important to point out that for the preferred embodiments of the invention the roof 13, 15 is concave and the supporting members 10, 12 (not shown in FIG. 3) are curved. By curving the roof 13, 15 of the greenhouse 4, any rainwater striking the roof will beneficially run down the sides 13, 15 of the roof to the ground. In the case of the multi-unit greenhouse 24, the rainwater will first traverse the gutter 26.

In the greenhouse 24, a different mechanism for opening the roof is illustrated, but the principle is the same as for the greenhouse 4, and the mechanisms may be used interchangeably. In the multi-unit greenhouse 24 the upper frame members 10 are raised using a worm gear 27 and a threaded shaft 27a instead of a rack and pinion. Additionally, there are many other types of mechanical means which can and may be substituted for the worm gear and the rack and pinion. Such mechanisms are well known in the art, and need not be specifically identified or described herein. Moreover, any or all may be operated manually or by motors.

The current method for controlling the inflation pressure of a double-polyethylene roof of a greenhouse is to try to balance the blower air volume with the leakage from the roof, by restricting the inlet to the blower. This method provides only crude and inexact control of the pressure in the roof. It also delays recovery of the roof inflation on a windy day, when the wind forces partially deflate the roof. The use of a back-pressure control valve, mounted either in one of the roof sheets or on the throat of the blower, to control the pressure at which the roof is inflated, would have a twofold benefit. First, the back-pressure control valve would provice a controlled inflation of the double-polyethylene roof; and second, it would allow the blower to run at full capacity, permitting faster recovery if the roof is partially deflated while preventing overinflation of the roof under normal conditions.

Figure 7:
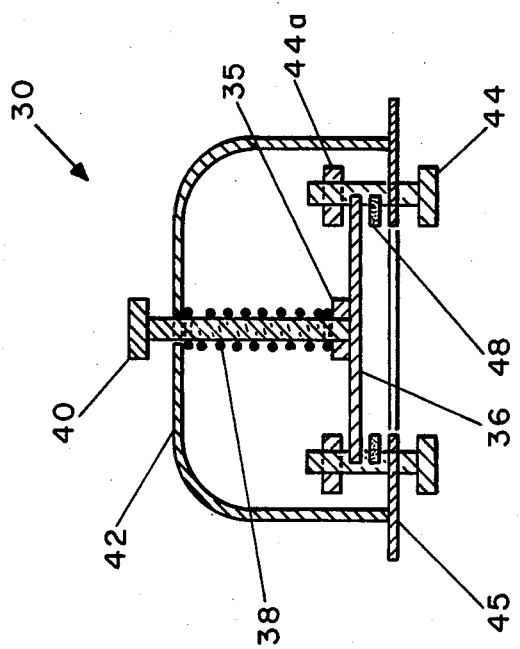
FIG. 7 is a view in cross-section of a device for automatically controlling the air pressure in a pouch between two sheets, taken along the cutting line shown in FIG. 8.

More specifically, reference is made to FIGS. 7 and 8, which show a back-pressure control valve, designated generally as 30, for controlling the air pressure in a pouch formed between two sheets, at least one of which is flexible. The control valve 30 comprises a support bracket 42 through which passes a guide shaft 40. One end of the shaft 40 is fastened through a threaded nut 35 to a movable sealing plate 36. The open end of the bracket 42 includes a flange 45, which is provided with bolts 44 and nuts 44a. A spring 38 on the shaft 40 provides biasing means for the plate 36. The spring 38 forces the plate 36 against gasket 48, to seal the valve 30 until the desired pressure is exceeded, whereat the plate 36 is back-pressured away from the gasket 48 and the excess pressure is relieved by venting.

Figure 10:
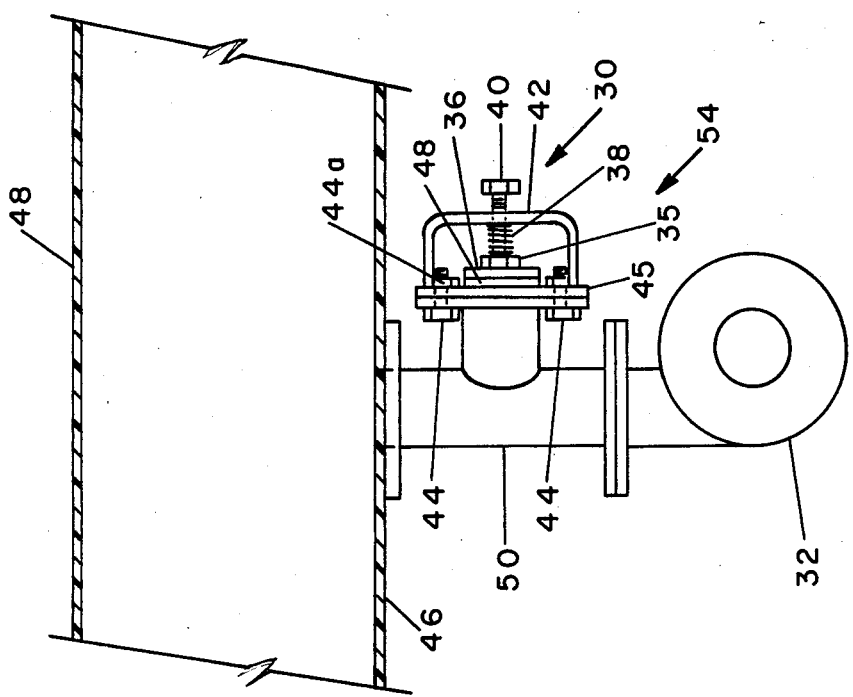
FIG. 10 is a view in cross-section of a second arrangement of the device shown in FIGS. 7 and 8, for controlling the air pressure in a pouch between two sheets.
Figure 9:
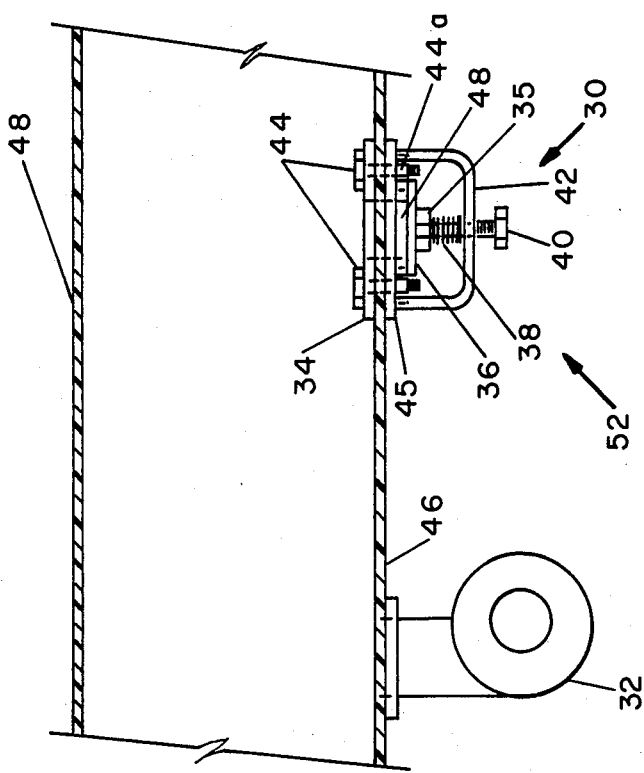
FIG. 9 is a view in cross-section of a first arrangement of the device shown in FIGS. 7 and 8, for controlling the air pressure in a pouch between two sheets.

FIG. 9 shows a first arrangement, designated generally as 52, for using the control valve 30 in combination with an air-blower 32, for controlling the air pressure between first and second sheets 46 and 48, at least one of which is flexible. FIG. 10 shows a second, alternative arrangement, designated generally as 54, in which a tee-connection 50 is included. While air would normally be the gas of choice, it is clear that the valve 30 and arrangements 52, 54 could utilize any gas.

The improvement which this modification comprises is effected by sealing two translucent sheets 46, 48, at least one of which is flexible, along their edges to form an inflatable pouch therebetween. This double sheet is then disposed above and supported by the first set of frame members 10. The process is repeated, and a second sealed double sheet is disposed above and supported by the second set of frame members 12.

The pouches are inflated, using arrangement 52 or 54, or any other equivalent arrangement. It is to be understood that the air-blower 32, the control valve 30, or both access the inflatable pouches through sealed openings in one of the sheets 46, 48, which are held between first and second flanges 45 and 34, respectively, as shown in FIGS. 9 and 10.

In the event that additional support or guide means are required or desired for the upper part 13 of the roof of greenhouse 4 or greenhouse 24, such means may be provided by, e.g., an L-bracket (not shown) to prevent lateral movement of the upper frame members 10 at each end of the greenhouse. The L-bracket may be beneficially mounted on the centerpost 22.

I claim:

1. A frame for a self-ventilating greenhouse, comprising:
   (a) first and second parallel rows of upright posts;
   (b) first and second sets of a plurality of first and second partially overlapping upper and lower frame members, a first end of each first frame member and a first end of each second frame member connected to the upper end of a post in the first row and the upper end of a post in the second row of posts, respectively, the second end of each first frame member disposed above and overhanging the second end of each second frame member, the first and second sets of frame members forming a frame for a self-ventilating roof for the greenhouse;
   (c) a plurality of transverse cross-members hingedly connecting the first and second sets of frame members near the second ends of the frame members, to guide the frame members as the frame members are separated and reunited to provide intermittent ventilation for the greenhouse; and
   (d) means for separating and reuniting the frame members.

2. The frame of claim 1, wherein the first and second frame members are arcuate frame members, thereby forming a frame for a concave roof for the greenhouse.

3. The frame of claim 1, wherein the means for separating and reuniting the frame members include a rack and pinion.

4. The frame of claim 1, wherein the means for separating and reuniting the frame members include a worm gear.

5. A self-ventilating greenhouse, comprising:
(a) a frame including first and second parallel rows of upright posts; a plurality of first and second partially overlapping upper and lower frame members, a first end of each first frame member and a first end of each second frame member connected to the upper end of a post in the first row and the upper end of a post in the second row of posts, respectively, the second end of each first frame member disposed above and overhanging the second end of each second frame member, the first and second frame members forming a frame for a self-ventilating roof for the greenhouse; a plurality of transverse cross-members hingedly connecting the first and second frame members near the second ends of the frame members, to guide the frame members as the frame members are separated and reunited to provide intermittent ventilation for the greenhouse; and means for separating and reuniting the frame members;
(b) a first translucent sheet disposed above and supported by the first frame members; and
(c) a second translucent sheet disposed above and supported by the second frame members, the first and second translucent sheets forming a self-ventilating roof for the greenhouse.

6. The greenhouse of claim 5, wherein the first and second frame members are arcuate members, thereby forming a concave roof for the greenhouse.

7. The greenhouse of claim 5, wherein the means for separating and reuniting the frame members include a rack and pinion.

8. The greenhouse of claim 5, wherein the means for separating and reuniting the frame members include a worm gear.

9. The greenhouse of claim 5, further comprising:
(d) a flexible third translucent sheet disposed above and supported by the first frame members, the edges of the first and third sheets sealed together to form an inflatable pouch between the first and third sheets;
(e) a flexible fourth translucent sheet disposed above and supported by the second frame members, the edges of the second and fourth sheets sealed together to form an inflatable pouch between the second and fourth sheets; the first, second, third, and fourth sheets forming an inflatable, self-ventilating roof for the greenhouse;
(f) means for inflating the pouch between the first and third sheets, and the pouch between the second and fourth sheets; and
(g) means for automatically controlling the pressure in the pouch between the first and third sheets, and the pouch between the second and fourth sheets.

10. The greenhouse of claim 9, wherein the means for controlling the pressure include:
(h) a first back-pressure control valve, for controlling the pressure in the pocket between the first and third sheets; and
(i) a second back-pressure control valve, for controlling the pressure in the pocket between the second and fourth sheets.

* * * * *